United States Patent [19]

Kuriyama

[11] Patent Number: 5,023,657
[45] Date of Patent: Jun. 11, 1991

[54] MICRO-IMAGE HANDLING APPARATUS WITH AUTOMATIC FOCUSING FUNCTION

[75] Inventor: Masaaki Kuriyama, Azuchi, Japan

[73] Assignee: Minolta Camera Kabushiki Kaisha, Osaka, Japan

[21] Appl. No.: 532,168

[22] Filed: Jun. 1, 1990

Related U.S. Application Data

[63] Continuation of Ser. No. 223,446, Jul. 22, 1988, abandoned.

[30] Foreign Application Priority Data

| Jul. 22, 1987 | [JP] | Japan | 62-184523 |
| Jul. 22, 1987 | [JP] | Japan | 62-184524 |
| Jul. 22, 1987 | [JP] | Japan | 62-184525 |
| Jul. 22, 1987 | [JP] | Japan | 62-184526 |

[51] Int. Cl.$^5$ ............................................. G03B 27/28
[52] U.S. Cl. ................................. 355/45; 355/56; 353/26 A
[58] Field of Search ..................... 355/43–45, 355/55, 56, 77; 353/26 A, 26 R, 27 A, 27 R, 25

[56] References Cited

U.S. PATENT DOCUMENTS

| 4,733,262 | 3/1988 | Taniguchi et al. | 354/402 |
| 4,768,052 | 8/1988 | Hamada et al. | 354/402 |
| 4,790,649 | 12/1988 | Harada et al. | 354/402 X |
| 4,791,445 | 12/1988 | Akada et al. | 354/402 |
| 4,816,860 | 3/1989 | Ida et al. | 354/402 |

FOREIGN PATENT DOCUMENTS

| 62-227241 | 11/1985 | Japan . |
| 62-105571 | 5/1987 | Japan . |
| 62-105574 | 5/1987 | Japan . |
| 62-108665 | 5/1987 | Japan . |
| 62-164031 | 7/1987 | Japan . |

Primary Examiner—A. A. Mathews
Assistant Examiner—D. Rutledge
Attorney, Agent, or Firm—Price, Gess & Ubell

[57] ABSTRACT

A microreader-printer having an automatic focusing function. According to this reader-printer, an autofocusing operation is discontinued in response to a frame search command, removal of a projecting lens from an optical path and removal of a microfilm carrier from an operative position. On the contrary, a print command being generated during the autofocusing operation in congress is suspended until the completion of the autofocusing operation.

25 Claims, 12 Drawing Sheets

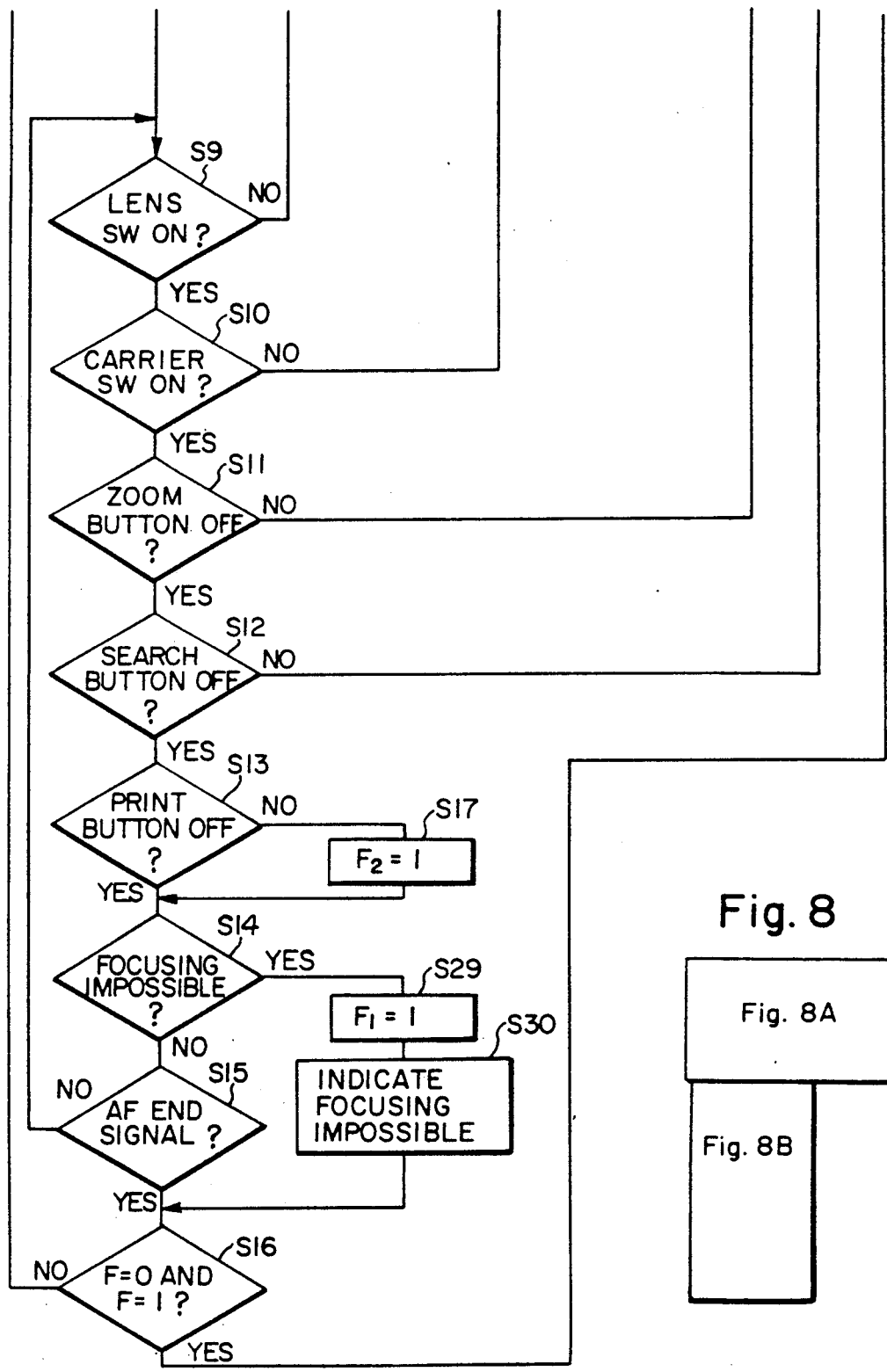

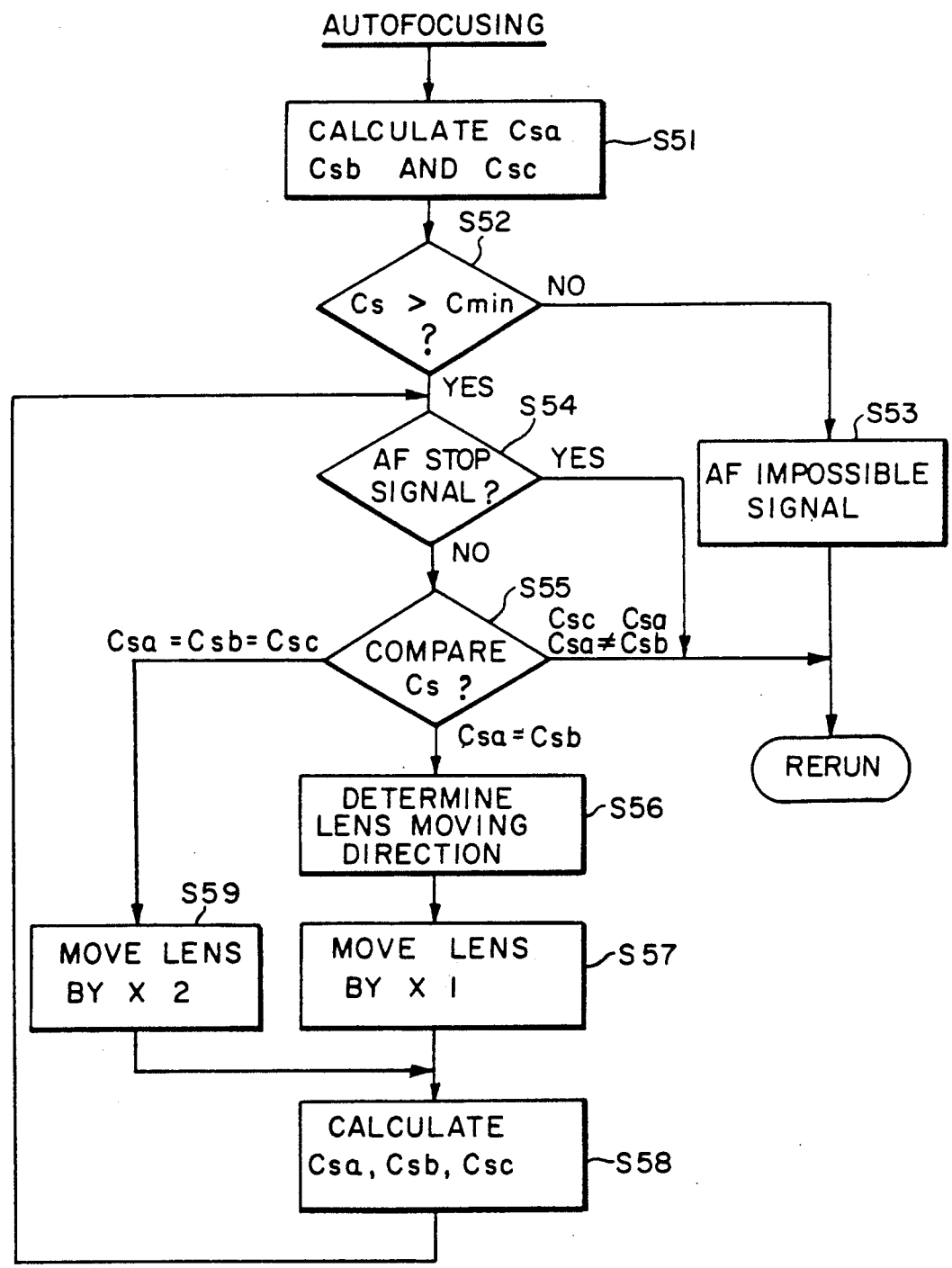

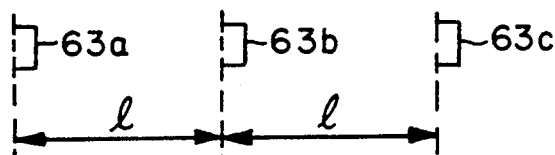
Fig. 11a
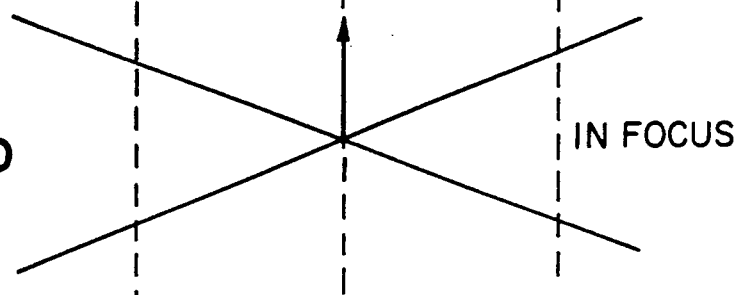
Fig. 11b — IN FOCUS
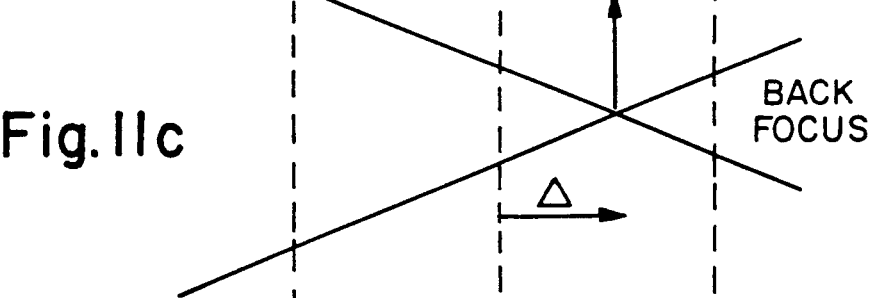
Fig. 11c — BACK FOCUS
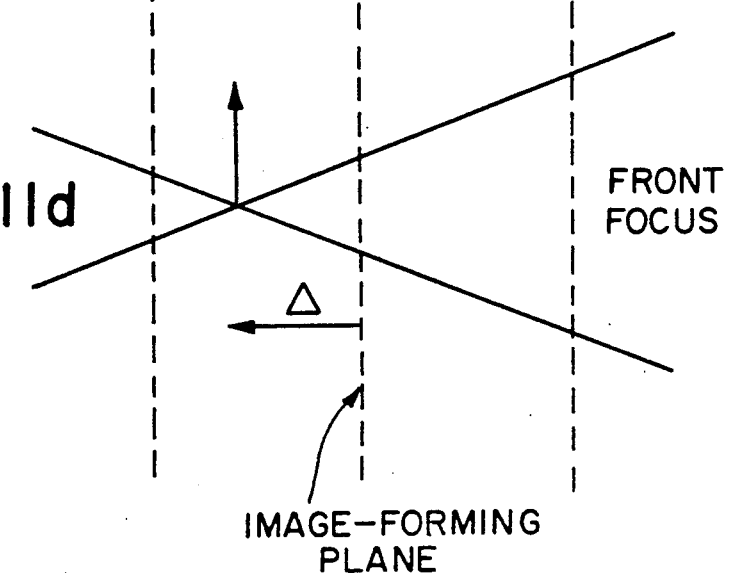
Fig. 11d — FRONT FOCUS
IMAGE-FORMING PLANE

MICRO-IMAGE HANDLING APPARATUS WITH AUTOMATIC FOCUSING FUNCTION

This is a continuation of application Ser. No. 223,446, filed on July 22, 1988, now abandoned.

BACKGROUND OF THE INVENTION

(1) FIELD OF THE INVENTION

The present invention relates to a micro-image handling apparatus with an automatic focusing function.

(2) DESCRIPTION OF THE PRIOR ART

With a microreader having a printing function, which is also known as a microreader-printer, a clear reproduction of an original image becomes difficult due to defocusing which occurs with changing of certain elements such as a projecting lens for projecting the original image in magnification through an optical system, a microfilm and a film carrier. Such defocusing does not present a serious problem to a reading mode in which the original image is projected onto a screen, but is detrimental to a printing mode for printing out the original image. Accordingly, a focusing operation is carried out with the existing microreader-printer before printing the original image.

The printing of the original image is started when the operator presses a print button. Normally the operator presses the print button when he or she wishes to print the image, with little attention to whether the machine is in the focusing process at the time. The operator often presses the print button during the focusing process, which gives rise to a problem in the relationship between the focusing operation and the printing operation. That is, a well-focused image cannot be printed where the focusing operation in progress is terminated in favor of a printing operation. Conversely, if an operation of the print button is nullified during the focusing operation, the operator must press the print button again after waiting for completion of the focusing operation, which adds trouble to the printing operation.

Similar inconveniences have been noted of the focusing operation in relation to (a) frame searching, (b) changing of the microfilm carrier, and (c) changing of the lens. Reasons for such inconveniences will be discussed next.

(a) The microreader-printer also has a frame searching function for finding a desired frame among a multiplicity of frames recorded on a microfilm, and this function has the following problem with the focusing function. Conventionally, a frame search does not override a focusing operation in progress even when a search button is pressed. Although the necessity to search a frame may arise during a focusing operation, the operator must take the trouble of waiting for completion of the focusing operation and pressing the print button again. Besides, a great variety of original images are recorded on a microfilm, and projecting magnification must be varied frequently for projecting different images. Each time the magnification is varied, certain optical conditions must be changed including a change in the focal length of the zoom lens and turning of the image, which in turn requires a focusing operation to be carried out all over again. The focal point set prior to a frame search is often of no avail, and therefore the focusing operation effected before becomes completely meaningless.

In order to solve this problem it is conceivable to allow the focusing and searching operations to proceed in parallel. But then the high speed movement of original images would impair focus detection or result in a detection error.

(b) Microfilms include the rolled type and microfiche type, and interchanging between the two types is usually carried out by changing the entire microfilm carrier. Since a different type of carrier results in a different focal point, a focusing operation must be carried out each time the carrier is changed. No problem arises if a focusing operation is carried out after the carrier is changed. However, when the carrier is changed during a focusing operation, the latter becomes meaningless and an operational error may take place.

(c) Original images are not always recorded on a microfilm in a uniform size, but may be recorded in various sizes such as B4, B5 and so on and in different magnification ratios. This requires the projecting lens to be changed frequently, which entails a similar problem in relation to the focusing operation. That is, when the projecting lens is changed during the focusing operation, the latter loses its meaning entirely and an operational error may take place.

SUMMARY OF THE INVENTION

A primary object of the present invention, therefore, is to provide an improved microreader which overcomes all of the foregoing disadvantages.

The above object is fulfilled, according to the present invention, by a micro-image handling apparatus comprising a screen; a projecting lens for projecting an image of a microfilm in magnification onto the screen; detecting means disposed on a projecting optical path for detecting focus states of the image as projected; autofocus means for moving the projecting lens along an optical axis in response to the detecting means; searching means for placing a selected frame of the microfilm on the projecting optical path in response to a search command; and control means for controlling an operation of the autofocus means, the control means being operable upon receipt of the search command during the operation of the autofocus means to stop the autofocus means and permit the searching means to operate.

The above object is fulfilled also by a micro-image handling apparatus in which the searching means is removably mounted in a main body of the micro-image handling apparatus, and the control means is operable to stop the autofocus means when removal of the searching means is detected during the operation of the autofocus means.

In one aspect of the invention, a micro-image handling apparatus comprises light path deflecting means disposed between the projecting means and the detecting means for deflecting the projecting optical path; image processing means for converting an optical image of the microfilm projected along a deflected optical path into a different form for output; and control means for controlling operation of the light path deflecting means and the image processing means. This control means is operable upon receipt of an image processing start command during the operation of the autofocus means to suspend the image processing start command until completion of the operation of the autofocus means and permit an image processing operation to be started after the completion of the operation of the autofocus means.

In a further aspect of the invention, a micro-image handling apparatus is provided wherein the projecting lens is removably mounted in the main body, and the control means is operable to stop the autofocus means when removal of the projecting lens is detected during the operation of the autofocus means.

Still further, the object of the invention is fulfilled by a micro-image handling apparatus wherein the projecting lens is a zoom lens capable of providing selected magnification ratios; and zooming means is provided for causing the projecting lens to carry out a zooming operation in response to a zoom command; and wherein the control means is operable upon receipt of the zoom command during the operation of the autofocus means to stop the autofocus means and permit the zooming means to operate.

According to the present invention, a focusing operation in progress is discontinued upon a search command to give way to a searching operation. Thus, the operator has only to press a search button to start the searching operation.

The focusing operation in progress is discontinued also when the microfilm carrier is removed from an operative position. This feature positively avoids a focus detection failure and an operational error of the control system which would take place if the focusing operation were continued while the microfilm carrier is changed.

Further, the focusing operation is discontinued when the projecting lens is removed from the optical path. This feature is effective to avoid a focus detection failure and an operational error of the control system which would take place if the focusing operation were continued while the lens is changed. In addition, the lens changing involves stoppage of a motor or other drive source for moving the projecting lens to effect focus adjustment, which provides an advantage in terms of power saving.

BRIEF DESCRIPTION OF THE DRAWINGS

The above and other objects, advantages and features of the invention will become apparent from the following description thereof taken in conjunction with the accompanying drawings which illustrate a specific embodiment of the invention. In the drawings:

FIGS. 8A, 8B is a flow chart illustrating an operation of the control system, FIG. 9 is a flow chart illustrating a focusing operation, FIGS. 11A-11B is a schematic view illustrating in-focus, front-focus and back-focus states.

DESCRIPTION OF THE PREFERRED EMBODIMENT

Figure 1:
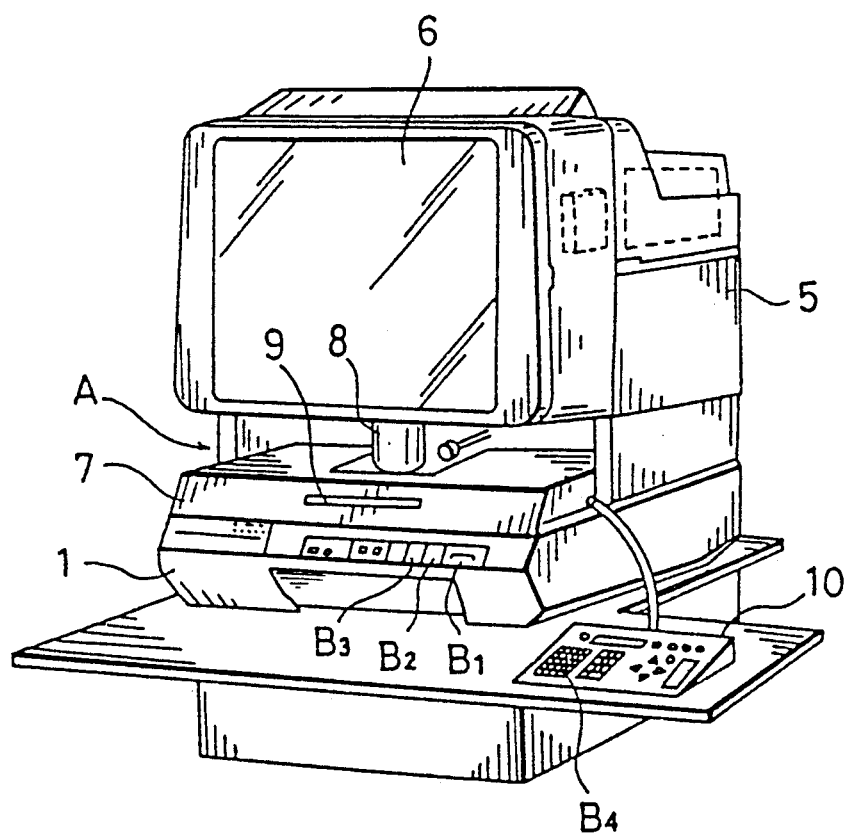
FIG. 1 is a perspective view of a microreader-printer constructed in accordance with the present invention.

FIG. 1 is a perspective view of a microreader-printer embodying the present invention. This microreader-printer comprises a lower portion 1 of a main body containing a light source for illuminating images, and a printer for printing images projected by the light source. The lower portion 1 of the main body also includes control buttons such as a print button B1, a zoom button B2 and an autofocus button B3 arranged along a front face thereof.

An upper portion 5 of the main body contains an optical system to be described later, and has a screen 6 on an upper front face thereof for displaying images when the optical system is in a reading mode. A mounting space A is provided under the screen 6, which accommodates, in the illustrated example, a fiche carrier 7 having a frame searching function. The fiche carrier 7 may be changed by drawing it toward the user. Although not shown, a roll film carrier may be placed in the mounting space A. When the fiche carrier 7 is mounted in position, a projecting lens 8 forming part of the projecting optical system is placed centrally of an upper surface of the carrier 7. Reference numeral 9 indicates a fiche inlet defined in a front face of the carrier 7. Reference numeral 10 indicates a controller connected to the main body of the reader-printer by a connecting cord. This controller 10 includes keys for inputting frame numbers to be searched, frame feed keys and other keys as referenced B4.

Figure 2:
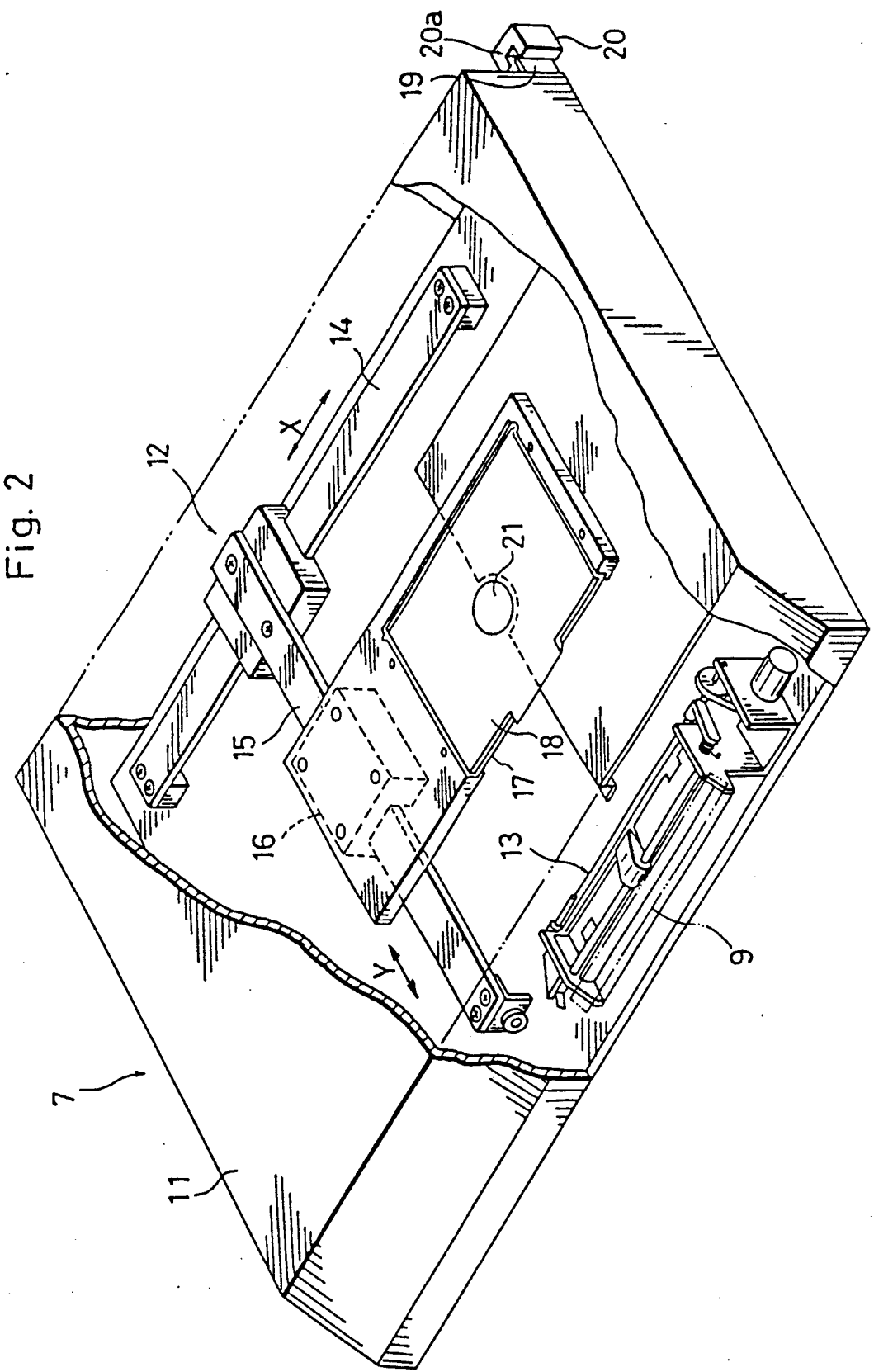
FIG. 2 is a perspective view, partly broken away, of a carrier used for searching a microfilm.

As shown in outline in FIG. 2, the fiche carrier 7 includes a flat box casing 11 containing an X-Y carrier 12 and a loading block 13. The X-Y carrier 12 comprises a combination of an X-axis linear motor 14 and a Y-axis linear motor 15 for transporting a movable deck 16 in selected directions on an X-Y plane. The movable deck 16 includes a film holder consisting of an upper and a lower transparent plates 17 and 18 for sandwiching an unillustrated microfiche therebetween. The X-axis and Y-axis linear motors 14 and 15 are operable by a search command given by a control circuit to be described later, to move the microfiche in appropriate directions and place a selected frame on an optical path. The loading block 13 is located in the vicinity of the film inlet 9 to perform film loading and unloading functions for delivering the microfiche inserted through the film inlet 9 to the position between the transparent plates 17 and 18 and for discharging the microfiche through the film inlet 9. The casing 11 carries a plate-like projection 19 on a righthand deep end corner. When the carrier 7 is mounted in a proper position in the mounting space A, the plate-like projection 19 enters a detecting recess 20a of a photo-interrupter 20 included in the main body of the reader-printer, whereby carrier mounting is detected. Reference numeral 21 in FIG. 2 indicates an optical path for allowing the light from the light source to illuminate the microfiche film.

Figure 3:
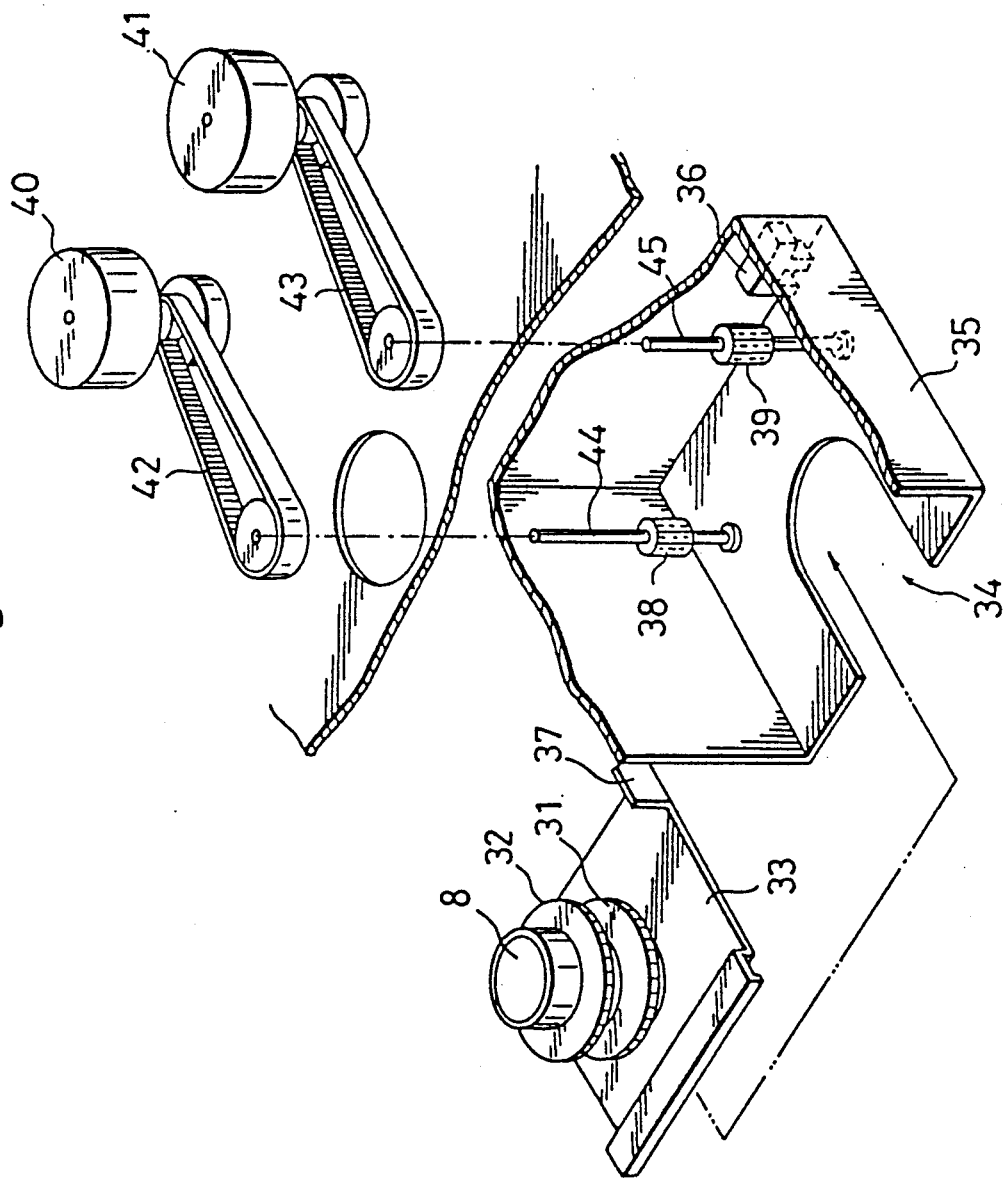
FIG. 3 is a view showing a projecting lens and an accommodating construction therefor.

FIG. 3 shows details of the projecting lens 8 placed on the fiche carrier 7, which lens is removably attached to the main body of the reader-printer. The illustrated lens 8 is a zoom lens having an autofocus gear 31 and a zoom gear 32 mounted peripherally thereof. This zoom lens is relatively movably fitted in a lens supporting unit 33. The main body of the reader-printer includes a lens case 35 defining a cutout at a position corresponding to the optical path as referenced at 34. The lens supporting unit 33 is slidable in the direction of an arrow on the bottom plate of the lens case 35 whereby the lens 8 is moved to the position 34 corresponding to the optical path. Although not shown, the upper plate 18 of the film holder is under the bottom plate of the lens case 35. Thus the lens 8 mounted as described above is placed on the upper plate 18 of the film holder. The lens case 35 includes a photoswitch 36 on a righthand wall thereof for detecting the lens 8 in position. When the lens 8 is mounted as described above, the photoswitch 36 detects a detection piece 37 formed at an appropriate position of the lens supporting unit 33. This provision allows confirmation to be made as to whether the lens 8 is mounted in position or not. Reference numeral 38 indicates an autofocus gear, and numeral 39 a zoom gear, which are mounted on rotary shafts 44 and 45 connected to motors 40 and 41 through timing belts 42 and 43, respectively. These gears 38 and 39 mesh with the corresponding gears 31 and 32 on the lens 8 when the lens 8 is mounted in position. The autofocus gear 38 is driven by the control circuit described later, to effect focus adjustment. The zoom gear 39 is driven upon operation of a magnification key provided on the front face of the main body.

Figure 4:
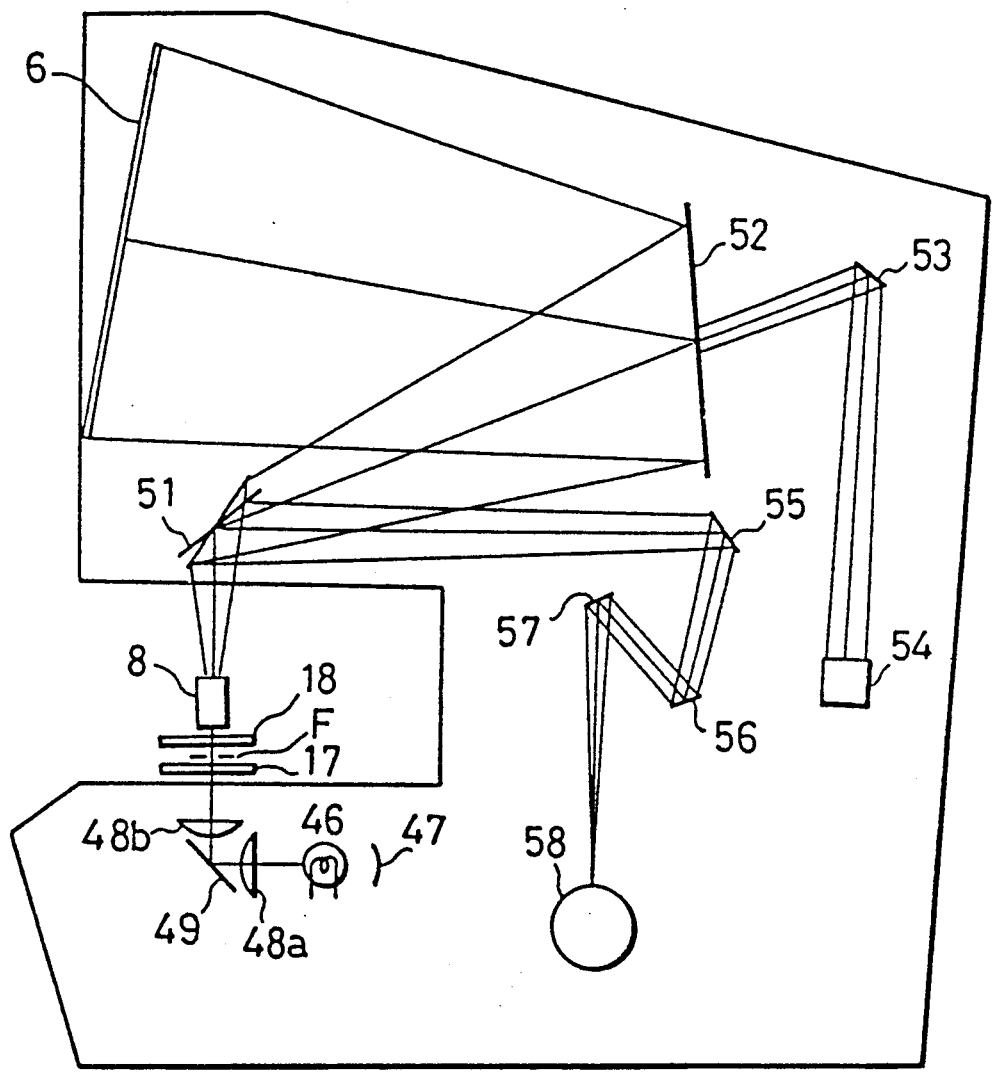
FIG. 4 is a view showing optical paths provided inside the microreader-printer.

FIG. 4 illustrates the projecting optical system disposed inside the microreader-printer. This optical system comprises the light source which is referenced at 46, a concave mirror 47, condenser lenses 48a and 48b, and an illuminating mirror 49. The light emitted from the light source 46 passes through the condenser lens 48b and illuminates a microfiche F sandwiched between the two transparent plates 17 and 18 of the film holder. The light having passed through the microfiche F reaches a first reflecting mirror 51. This mirror 51 is rotatable to selectively deflect the light in two directions. One of these directions provides a reader optical path reflected by a half mirror 52 and leading to the screen 6, and a focus detection optical path extending through the half mirror 52, deflected by a second reflecting mirror 53 and reaching a focus detector 54. The other direction provides a printer optical path deflected by a third mirror 55, a fourth mirror 56 and a fifth mirror 57 and reaching a photoreceptor drum 58.

Figure 5:
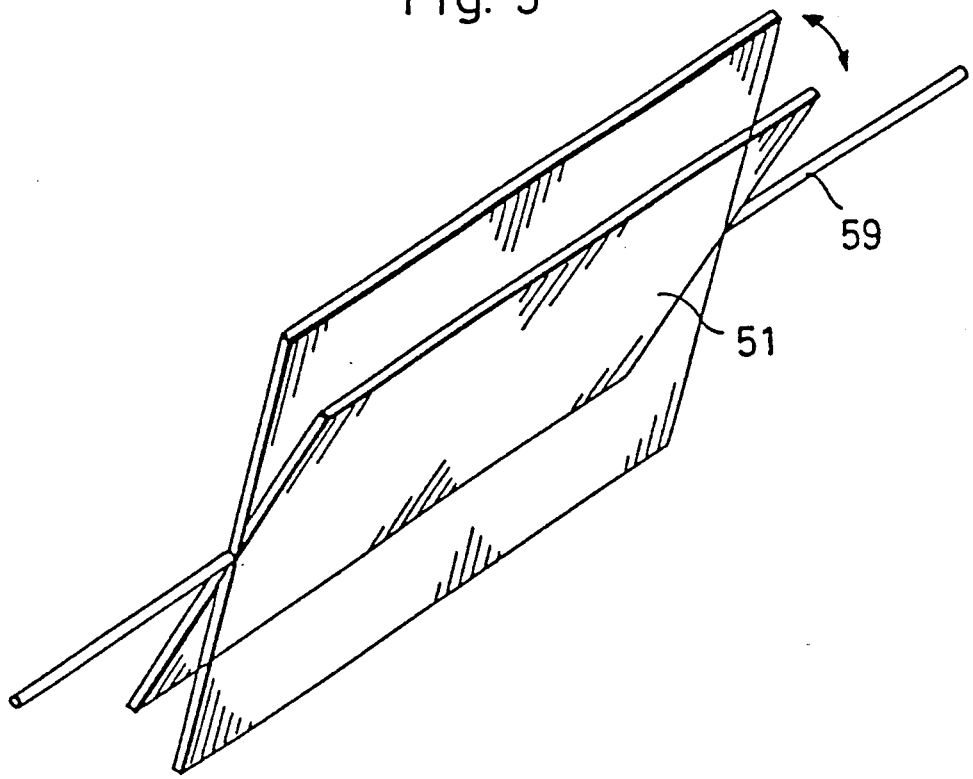
FIG. 5 is a view showing a first mirror for deflecting an optical path
Figure 6:
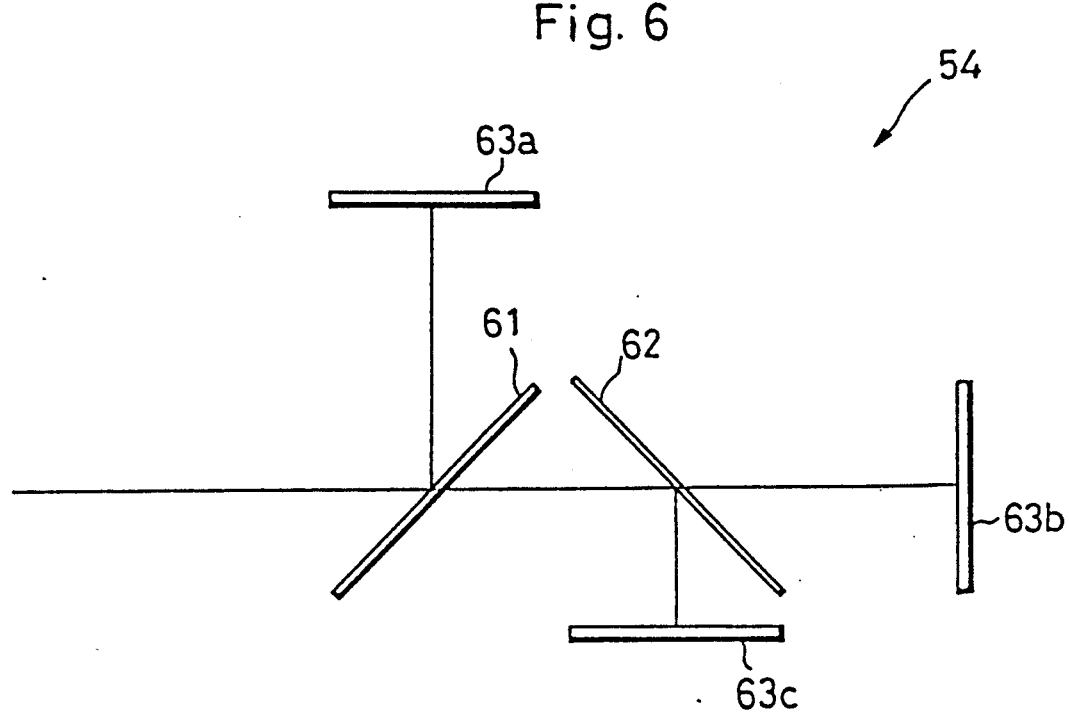
FIG. 6 is a view showing the construction of a focus detector.

As shown in FIG. 5, the first mirror 51 is supported at a vertical middle position by a cross shaft 59. The cross shaft 59 is connected to and driven by a motor or other oscillating mechanism not shown, to selectively form optical paths in the above two directions. When the printer optical path is selected, the mirror 57 is rotated at a predetermined speed to record images.

Where the TTL (through-the-lens) mode is employed, the focus detector 54 may detect focusing by means of contrast difference or phase difference. In this embodiment, as shown in FIG. 6, the focus detector 54 includes a half mirror 61 having a transmittance of ⅔, a half mirror 62 having a transmittance of ½, and three two-dimensional CCDs 63a, 63b and 63c, for detecting focus states by means of contrast difference. The CCD 63c has a light receiving surface disposed on an intended image-forming plane with respect to the projecting lens 8. The CCDs 63a and 63b have light receiving surfaces disposed at selected distances forwardly and rearwardly from the intended image-forming plane, respectively. How this focus detector 54 operates will be described later.

Figure 7:
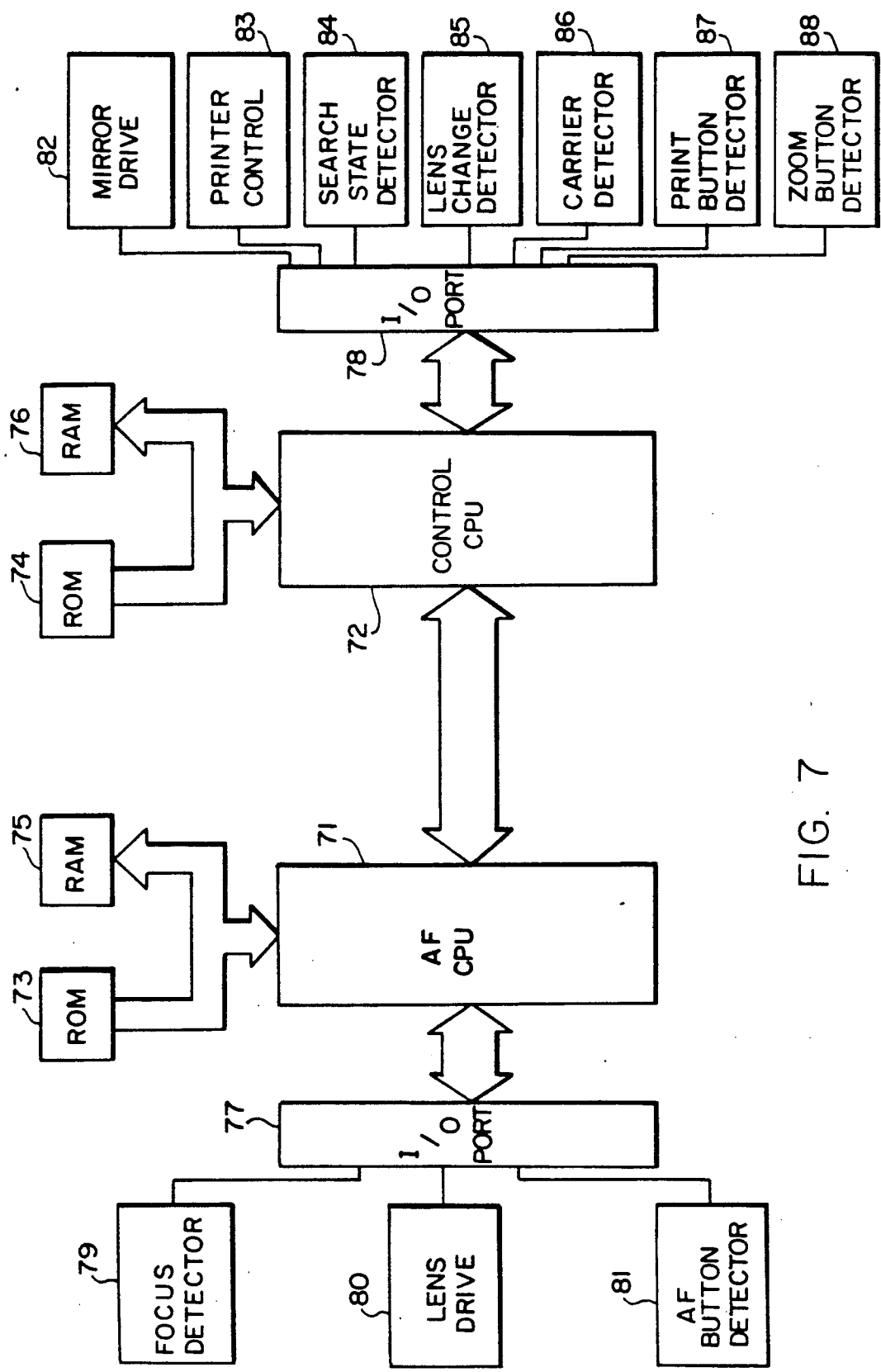
FIG. 7 is a block diagram of a control system of the microreader-printer.

FIG. 7 shows a system for controlling the microreader-printer. This system comprises two CPUs, i.e. an autofocus control CPU 71 and a reader-printer control CPU 72. Each CPU 71 or 72 is connected to a ROM 73 or 74, a RAM 75 or 76 and an I/O port 77 or 78. The I/O port 77 is connected to input or output devices 79–81 while the I/O port 78 is connected to input or output devices 82–88. Although only 10 such devices are shown in the drawing, there are other devices such as a carrier control device and an exposure control device. The illustrated focus detecting mechanism 79 includes a circuit for driving the CCDs 63a–63c and a circuit for transmitting light-receiving signals from the CCDs to the I/O port 77. The lens moving mechanism 80 and the first mirror oscillating circuit 82 each comprise drive means such as a stepping motor and a circuit for detecting positions of the lens or the mirror. The AF button detecting circuit 81 is for detecting ON/OFF operation of a switch associated with the AF button B3. The printer control mechanism 83 comprises a mechanism for actuating a series of devices at appropriate timing in order to print out images of the microfiche by using the photoreceptor drum 58. The search state detecting circuit 84 is a circuit for monitoring movement of the film moving motors, namely the X-axis linear motor 14 and Y-axis linear motor 15, and outputting a search starting signal and a search ending signal when either motor 14 or 15 starts and stops the movement. The lens change detecting circuit 85 is a circuit for shaping and amplifying the detection signal from the photoswitch 36 shown in FIG. 3. The film carrier detecting circuit 86 is a circuit for shaping and amplifying the detection signal from the photointerrupter 20 shown in FIG. 2. The print button detecting circuit 87 and zoom button detecting circuit 88 are circuits for detecting ON/OFF operations of switches associated with the print button and the zoom button, respectively.

Figure 8A:
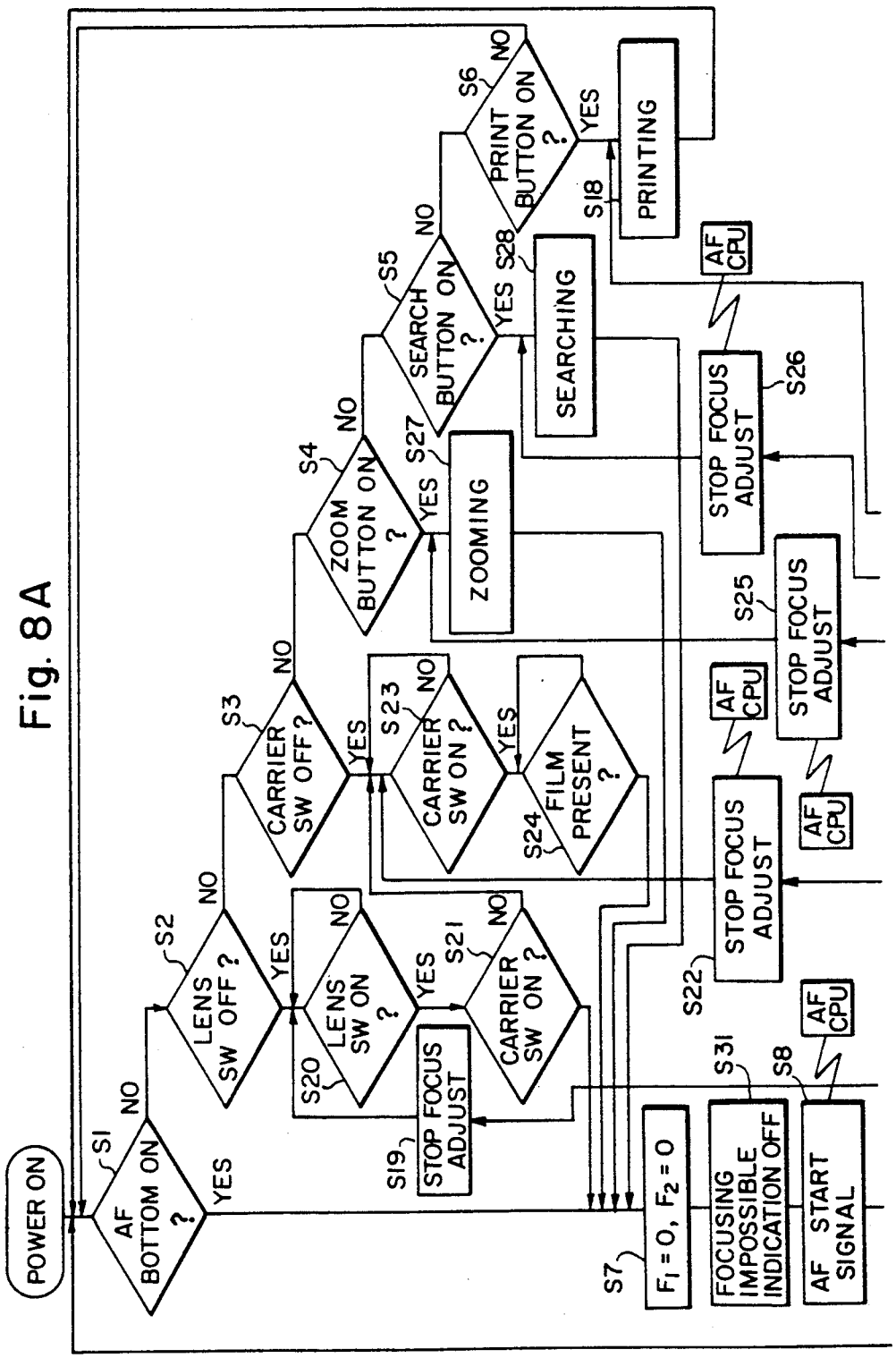

FIG. 8 is a flow chart for illustrating an operation of the reader-printer control CPU. When power is switched on with the film carrier 7 placed in the mounting space A and the projecting lens 8 in position, the program makes a circulating flow from step S1 through step S6 and back to step S1. If the autofocus button is pressed during this process, the reader-printer control CPU 72 resets flags F1 and F2 at step S7 and transmits an autofocusing start signal to the autofocus control CPU 71 at step S8. Then the autofocus control CPU 71 starts an autofocusing operation. In parallel with the autofocusing operation and until the operation is completed, the reader-printer control CPU 72 is operable following a circulating flow of the program from step S9 through step S15. Step S9 is for checking whether the photoswitch 36 detects presence of the projecting lens 8. Step S10 is for checking whether the photo-interrupter 20 detects the film carrier 7 in position. Step S11 is for checking whether the zoom button detecting circuit detects the zoom button remaining out of operation. Step S12 is for checking whether the search state detecting circuit finds that the microfiche is not searched. When the autofocus control CPU 71 completes the focusing operation, a corresponding signal is transmitted from the CPU 71 to CPU 72 at step S15 and the program moves to step S16. Unless the print button is pressed at this time, the flag F2 remains reset and, therefore, F1=F2=0. The program then returns from step S16 to step S1, and makes the circulating flow from step S1 through step S6. If the print button is pressed during this process, the program moves from step S6 to step S18 for carrying out a printing operation. On the other hand, if step S13 finds that the print button is pressed during the process S from step S7 through step S16, the flag F2 is set to "1" at step S17. Consequently, the program moves from step S16 to step S18 for the printing operation, depending on the result of checking made at step S16.

If the projecting lens 8 is changed while the autofocus control CPU 71 is carrying out the focusing operation, there is no point in continuing the operation since a new lens having a different focal point will be installed. Consequently, the program moves from step S9 to step S19 for transmitting a focusing operation stop signal to the autofocus control CPU 71 for discontinuing the focusing operation. The focusing operation is started again when the new lens is detected at step S20 and presence of the film carrier in the space A is detected at step S21.

The focusing operation becomes meaningless when the film carrier for microfiches is replaced with a carrier for roll films as when the projecting lens is changed. In this case, the program moves from step S10 to step S22 to discontinue the focusing operation. The focusing operation is started again when the new carrier is detected at step S23 and presence of a film in the carrier is detected at step S24.

Similarly, the focusing operation is discontinued when the zoom button is pressed or when a search for a frame image is started (steps S25 and S26). The focusing operation is started again after waiting for completion of a zooming operation or a searching operation (steps S27 and S28).

When the print button is pressed during the focusing operation, the operation is continued as distinct from the case of changing the lens or the carrier or pressing of the zoom button. A printing operation should normally be carried out after completion of the focusing operation, and therefore the printing operation is carried out as described hereinbefore following the focusing operation. The focusing operation is impossible if, for example, an original image is not found on the film located on the projecting optical path. In such a case, the program moves from step S14 to step S29 to set the flag F1 for memorizing that the focusing operation is impossible, and gives an indication to that effect at step S30. At the same time, the program moves from step S16 to step S1 to return to the focusing operation standby state. The indication given at step S30 is eliminated at step S31 when the autofocus button is pressed again. Thus, even if the print button is pressed in the above case, the resulting data is cancelled thereby to nullify the printing operation. However, when the print button is pressed in the focusing operation standby state, namely the circulating flow from step S1 through step S6 and back to step S1, the program moves from step S16 to step S18 to carry out a printing operation. In this case, the operator starts the printing operation with the knowledge that the autofocusing is impossible. The operator, therefore, presses the print button after effecting a manual focusing operation.

The above operations are carried out on the condition that the autofocus button is pressed. As far as the program is concerned, however, the focusing operation is carried out automatically without pressing the autofocus button when the lens is changed (steps S2, S20 and S21), when the carrier is changed (steps S3, S23 and S24), when the zoom button is pressed (steps S4 and S27), or when a film search is completed (steps S5 and S28).

Figure 10:
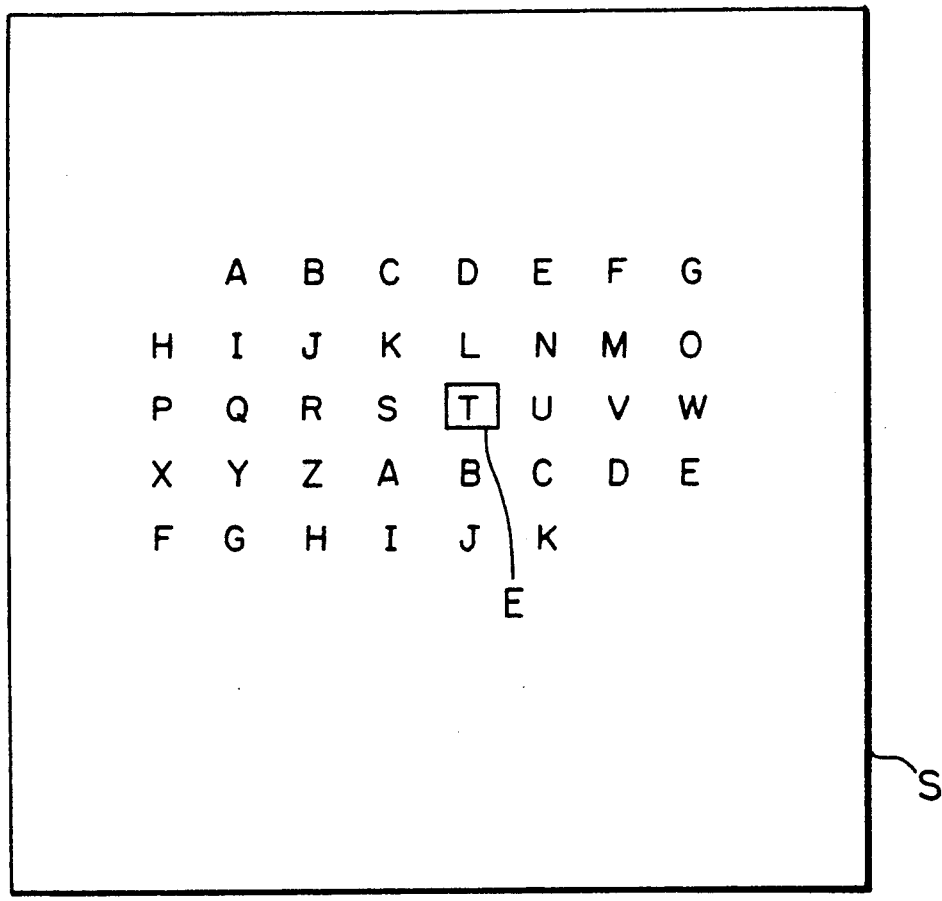
FIG. 10 is a view showing a detection area of the focus detector on a screen-equivalent plane.

The operation of the autofocus control CPU will be described next with reference to the flow chart shown in FIG. 9. The first mirror 51 is oscillated first to form the focus detecting optical path, and each of the CCDs 63a-63b is set so that a detection area is provided, as indicated by reference "E" in FIG. 10, at an approximately central position of a screen-equivalent plane S. Thereafter, the CPU 71 checks light-receiving outputs of pixels of all the CCDs 63a-63c, and derives a difference Cs between a maximum level Lmax and a minimum level Lmin of the outputs at step S51.

$$Cs = Lmax - Lmin \quad (1)$$

Figure 12:
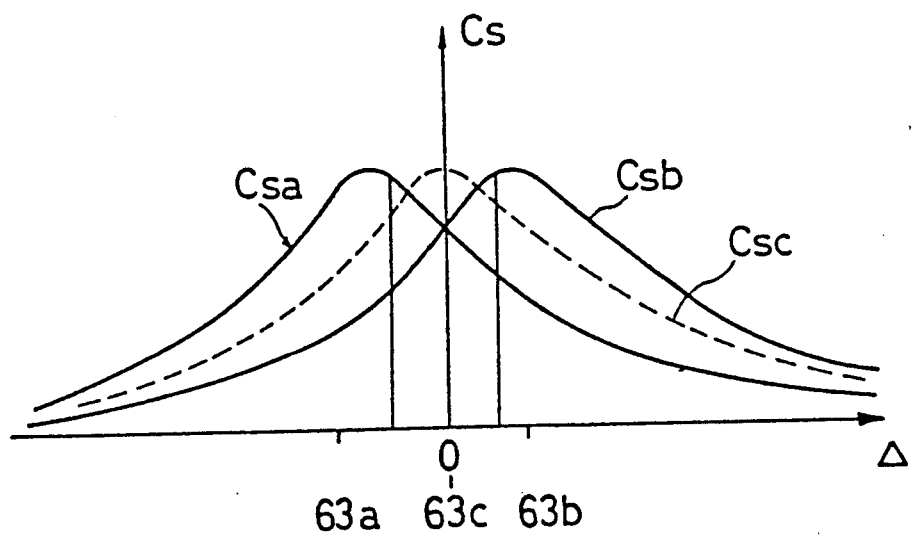
FIG. 12 is a view illustrating illuminance distributions in the three states shown in FIG. 11.

The value of Cs for CCD 63a is referred to herein as Csa, the value of Cs for CCD 63b as Csb, and the value of Cs for CCD 63c as Csc. An image is formed on the light-receiving surface of the CCD which provides a maximum value of Cs. FIG. 11 schematically shows relationship between the CCDs 63a-63c and in-focus, front-focus and back-focus states. FIG. 12 shows characteristics of the Cs value of each CCD in the states shown in FIG. 11 (b), (c) and (d). It will be seen that, in the in-focus state of FIG. 11 (b), the Cs levels of the CCDs are such that Csc is greater than Csa and Csa equals Csb. In the back-focus state of FIG. 11 (c), Csa is smaller than Csb. In the front-focus state of FIG. 11 (d), Csa is greater than Csb. After calculating the Cs values, the program moves to step S52 for comparing the Cs values with a minimum contrast Cmin for enabling the focus detector to discern the focus. If all of the Cs values are smaller than the minimum contrast Cmin, the program moves to step S53 for generating an autofocus impossible signal.

If any Cs value exceeds Cmin, the program moves to step S54 for checking whether the autofocusing stop signal has been received or not. If it has, the program stops the autofocusing operation and makes a return. If not, the program moves to step S55 for comparing the Cs values. When Csa and Csb are not equal, the program moves to step S56 for deciding which is the greater of the two values. If Csa is greater, it is indicative of the front-focus state. If Csb is greater, it is indicative of the back-focus state. Thus, the direction in which the projecting lens should be moved is determined. At step S57, the autofocus control CPU 71 reads distance information stored in the ROM and transmits a control signal to the lens drive mechanism 80, whereby the projecting lens 8 is moved in the direction determined at step S56. At step S57 the lens 8 is moved by a smaller amount X1 than when Csa, Csb and Csc are all equal. This is based on the consideration that an image is formed near the focal point when Csa and Csb are not equal, and remote from the focal point when Csa, Csb and Csc are equal.

After completing the lens movement, Csa, Csb and Csc are calculated again at step S58, absence of the autofocusing stop signal is confirmed at step S54, and the Cs values are compared at step S55. This operation is repeated until Csc becomes greater than Csa and Csa equals Csb.

When all the Cs values are found equal at step S55, the image-forming point of the projecting lens 8 is very far from the screen-equivalent plane. Consequently, the program moves to step S59 for driving the lens moving mechanism 80 to move the projecting lens 8 by the predetermined amount X2. Thereafter, the Cs values are calculated at step S58, and are compared at step S55. This operation is repeated until Csa and Csb become unequal, thereby to realize the in-focus state as in the foregoing case.

The present invention has been described as embodied into a microreader having a printing function to print out an original image, which is also known as a microreader-printer. However, the invention is not limited to this type of microreader. The invention is also applicable to a microreader having an image processing function to read an original image and output a corresponding image signal, which is also known as a microreader-scanner.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A micro-image handling apparatus comprising:
   a projecting lens for projecting an image of a microfilm in magnification;
   detecting means disposed on a projecting optical path for detecting focus states of the image as projected;
   autofocus means for moving said projecting lens along an optical axis in response to said detecting means;
   searching means for placing a selected frame of said microfilm on the projecting optical path in response to a search command;
   first control means for controlling an operation of said autofocus means and said searching means, upon receipt of the search command during the operation of said autofocus means, to stop the operation of said autofocus means and initiate said searching means to operate; and
   second control means for controlling said autofocus means to operate automatically when a selected frame is placed on the projecting optical path by said searching means.

2. A micro-image handling apparatus as claimed in claim 1, wherein said microfilm is a microfiche, and said searching means is a transport means for transporting said microfiche on an X-Y plane perpendicular to an optical path extending from a light source.

3. A micro-image handling apparatus as claimed in claim 1, wherein said autofocus means includes two-dimensional sensors disposed at a position corresponding to an intended image-forming plane of said projecting lens, a position short of the intended image-forming plane, and a position beyond the intended image forming plane, whereby an in-focus state is detected by deriving contrast differences of said sensors.

4. A micro-image handling apparatus comprising:
   a projecting lens for projecting an image of a microfilm in magnification;
   detecting means disposed on a projecting optical path for detecting focus states of the image as projected;
   autofocus means for moving said projecting lens along an optical axis in response to said detecting means;
   searching means removably mounted in a main body of said micro-image handling apparatus for placing a selected frame of said microfilm on the projecting optical path in response to a search command;
   first control means for controlling an operation of said autofocus means, said control means being operable to stop the operation of said autofocus means when removal of said searching means is detected during the operation of said autofocus means; and
   second control means for controlling said autofocus means to operate automatically when said searching means is mounted in said main body.

5. A micro-image handling apparatus as claimed in claim 4, wherein said microfilm is a microfiche, and said searching means is a transport means for transporting said microfiche on an X-Y plane perpendicular to an optical path extending from a light source.

6. A micro-image handling apparatus as claimed in claim 4, wherein said autofocus means includes two-dimensional sensors disposed at a position corresponding to an intended image-forming plane of said projecting lens, a position short of the intended image-forming plane, and a position beyond the intended image forming plane, whereby an in-focus state is detected by deriving contrast differences of said sensors.

7. A micro-image handling apparatus, comprising:
   a screen;
   a projecting lens for projecting an image of a microfilm in magnification onto said screen;
   detecting means disposed on a projecting optical path for detecting focus states of the image as projected;
   autofocus means for moving said projecting lens along an optical axis in response to said detecting means, said autofocus means including two-dimensional sensors disposed at a position corresponding to an intended image-forming plane of said projecting lens, a position short of the intended image-forming plane, and a position beyond the intended image forming plane, whereby an in-focus state is detected by deriving contrast differences of said sensors;
   light path deflecting means disposed between said projecting means and said detecting means for deflecting said projecting optical path;
   image processing means for converting an optical image of the microfilm projected along a deflected optical path into a different form for output; and
   control means for controlling operation of said light path deflecting means and said image processing means, said control means being operable upon receipt of an image processing start command during the operation of said autofocus means to suspend said image processing start command until completion of the operation of said autofocus means and permit an image processing operation to be started after the completion of the operation of said autofocus means.

8. A micro-image handling apparatus comprising:
   a projecting lens removably mounted in a main body of said micro-image handling apparatus for projecting an image of a microfilm in magnification;
   detecting means disposed on a projecting optical path for detecting focus states of the image as projected;
   autofocus means for moving said projecting lens along an optical axis in response to said detecting means;
   means for detecting mounting of said projecting lens in said main body;
   first control means for controlling an operation of said autofocus means, said control means being operable to stop the operation of said autofocus means when removal of said projecting lens is detected during the operation of said autofocus means; and second control means for controlling said autofocus means to operate automatically when said projecting lens is mounted in said main body.

9. A micro-image handling apparatus as claimed in claim 8, wherein said autofocus means includes two-dimensional sensors disposed at a position corresponding to an intended image-forming plane of said projecting lens, a position short of the intended image-forming plane, and a position beyond the intended image forming plane, whereby an in-focus state is detected by deriving contrast differences of said sensors.

10. A micro-image handling apparatus as claimed in claim 8, wherein said autofocus means includes a motor mounted in said main body, and a drive transmission mechanism for transmitting drive of said motor to said projecting lens removably mounted in said main body.

11. A micro-image handling apparatus comprising:
a projecting lens for projecting an image of a microfilm in magnification, said projecting lens being a zoom lens capable of providing selected magnification ratios;
detecting means disposed on a projecting optical path for detecting focus states of the image as projected;
autofocus means for moving said projecting lens along an optical axis in response to said detecting means;
zooming means for causing said projecting lens to carry out a zooming operation in response to a zoom command;
first control means for controlling an operation of said autofocus means and said zooming means, upon receipt of the zoom command during the operation of said autofocus means, to stop the operation of said autofocus means and permit said zooming means to operate; and
second control means for controlling said autofocus means to operate automatically when said zooming operation is finished by said zooming means.

12. A micro-image handling apparatus as claimed in claim 11, wherein said autofocus means includes two-dimensional sensors disposed at a position corresponding to an intended image-forming plane of said projecting lens, a position short of the intended image-forming plane, and a position beyond the intended image forming plane, whereby an in-focus state is detected by deriving contrast differences of said sensors.

13. A micro-image handling apparatus comprising:
supporting means removably mounted in a main body of said micro-image handling apparatus for supporting a microfilm;
a projecting lens for projecting an image of the microfilm supported by said supporting means;
detecting means disposed on a projecting optical path for detecting focus states of the image as projected;
autofocus means for moving said projecting lens along an optical axis in response to said detecting means; and
control means for controlling an operation of said autofocus means, said control means being operable to stop said autofocus means when said supporting means is removed during the operation of said autofocus means.

14. In a micro-image handling apparatus comprising an autofocus means for moving a projecting lens along an optical axis and a searching means for placing a selected image of a microfilm on the projecting optical axis in response to a search command, a method of controlling the apparatus comprising the steps of:
starting the operation of the autofocus means;
stopping an operation of the autofocus means and initiating an operation of the searching means in response to the receipt of the search command; and
restarting the operation of the autofocus means when the selected image is placed on the projecting optical axis by the searching means.

15. A micro-image handling apparatus comprising:
a projecting lens movably mounted in the apparatus so as to be located on and out of an optical axis for projecting a magnified image of a microfilm;
detecting means disposed on a projecting optical path for detecting focus states of the image as projected;
autofocus means for moving said projecting lens along the optical axis in response to said detecting means;
means for detecting location of said projecting lens on the optical axis;
first control means for controlling an operation of said autofocus means, said control means being operable to stop the operation of said autofocus means when said projecting lens is located off of the optical axis during the operation of said autofocus means; and
second control means for controlling said autofocus means to operate automatically when said projecting lens is located on the optical axis.

16. A micro-image handling apparatus comprising:
a projecting lens for projecting a magnified image of a microfilm, said projecting lens being a zoom lens capable of a zooming mode of operation to provide selected magnification ratios;
detecting means disposed on a projecting optical path for detecting focus states of the image as projected;
autofocus means for moving said projecting lens along an optical axis in response to said detecting means;
first control means for controlling an operation of said autofocus means to stop the operation of said autofocus means when zooming is started, and
second control means for controlling said autofocus means to operate automatically when zooming is finished.

17. A micro-image handling apparatus comprising:
a projecting lens for projecting a magnified image from a microfilm;
detecting means disposed on a projecting optical path for detecting focus states of the image as projected;
autofocus means for moving said projecting lens along an optical axis in response to said detecting means;
searching means for selectively placing a desired frame of said microfilm on the projecting optical path;
first control means for controlling an operation of said autofocus means to stop the operation of said autofocus means when said searching means is in operation, and
second control means for controlling said autofocus means to operate automatically when a desired frame is placed on the projecting optical path by the operation of said searching means.

18. In a micro-image handling apparatus comprising an autofocus means for moving a projecting lens along an optical axis and a supporting means for movably supporting a microfilm so as to selectively place a desired image of the microfilm on the projecting optical axis by its movement, a method of controlling the apparatus comprising the steps of:

starting the operation of the autofocus means;

stopping an operation of the autofocus means when said supporting means is enabled to move, and restarting the operation of the autofocus means when the desired image is placed on the projecting optical axis by the movement of said supporting means.

19. A micro-image handling apparatus comprising:

a projecting lens for projecting an image onto a microfilm with magnification of the image;

detecting means disposed on a projecting optical path for detecting focus states of the image as projected;

autofocus means for moving said projecting lens along an optical axis in response to said detecting means;

searching means for placing a selected frame of said microfilm on the projecting optical path in response to a search command, and control means for controlling said autofocus means to operate automatically when a selected frame is placed on the projecting optical path by said searching means.

20. A micro-image handling apparatus comprising:

a projecting lens for projecting an image onto a microfilm with magnification of the image;

detecting means disposed on a projecting optical path for detecting focus states of the image as projected;

autofocus means for moving said projecting lens along an optical axis in response to said detecting means;

searching means removably mounted in a main body of said micro-image handling apparatus for placing a selected frame of said microfilm on the projecting optical path in response to a search command, and control means for controlling said autofocus means to operate automatically when said searching means is mounted in said main body.

21. A micro-image handling apparatus comprising:

a projecting lens for projecting an image onto a microfilm with magnification of the image, said projecting lens being a zoom lens capable of providing selected magnification ratios;

detecting means disposed on a projecting optical path for detecting focus states of the image as projected;

autofocus means for moving said projecting lens along an optical axis in response to said detecting means;

zooming means for causing said projecting lens to carry out a zooming operation in response to a zoom command, and control means for controlling said autofocus means to operate automatically when said zooming operation is finished by said zooming means.

22. A micro-image handling apparatus comprising:

a projecting lens mounted in the apparatus so as to be removable from an optical axis for projecting an image onto a microfilm with magnification of the image;

detecting means disposed on a projecting optical path for detecting focus states of the image as projected;

autofocus means for moving said projecting lens along the optical axis in response to said detecting means;

means for detecting mounting of said projecting lens on the optical axis, and control means for controlling said autofocus means to operate automatically when said projecting lens is mounted on the optical axis.

23. A micro-image handling apparatus comprising:

a projecting lens for projecting an image onto a microfilm with magnification of the image, said projecting lens being a zoom lens capable of zooming to provide selected magnification ratios;

detecting means disposed on a projecting optical path for detecting focus states of the image as projected;

autofocus means for moving said projecting lens along an optical axis in response to said detecting means, and control means for controlling said autofocus means to operate automatically when zooming is finished.

24. A micro-image handling apparatus comprising:

a projecting lens for projecting an image onto a microfilm with magnification of the image;

detecting means disposed on a projecting optical path for detecting focus states of the image as projected;

autofocus means for moving said projecting lens along an optical axis in response to said detecting means;

supporting means provided movable for supporting a microfilm so as to selectively place a desired frame of the microfilm on the projecting optical axis by its movement, and control means for controlling said autofocus means to operate automatically when a desired frame is placed on the projecting optical path by the movement of said supporting means.

25. In a micro-image handling apparatus comprising an autofocus means for moving a projecting lens along an optical axis and a supporting means for movably supporting a microfilm so as to selectively place a desired image of the microfilm on the projecting optical axis by its movement, a method of controlling the apparatus comprising the steps of:

moving said supporting means to place the desired image of the microfilm on the projecting optical axis, and starting the operation of the autofocus means when the desired image is placed on the projecting optical axis by the movement of said supporting means.

* * * * *